Sept. 23, 1958
J. W. LENEHAN
2,853,150
COLLECTING ELECTRODE STRUCTURE
Filed June 3, 1955
5 Sheets-Sheet 2
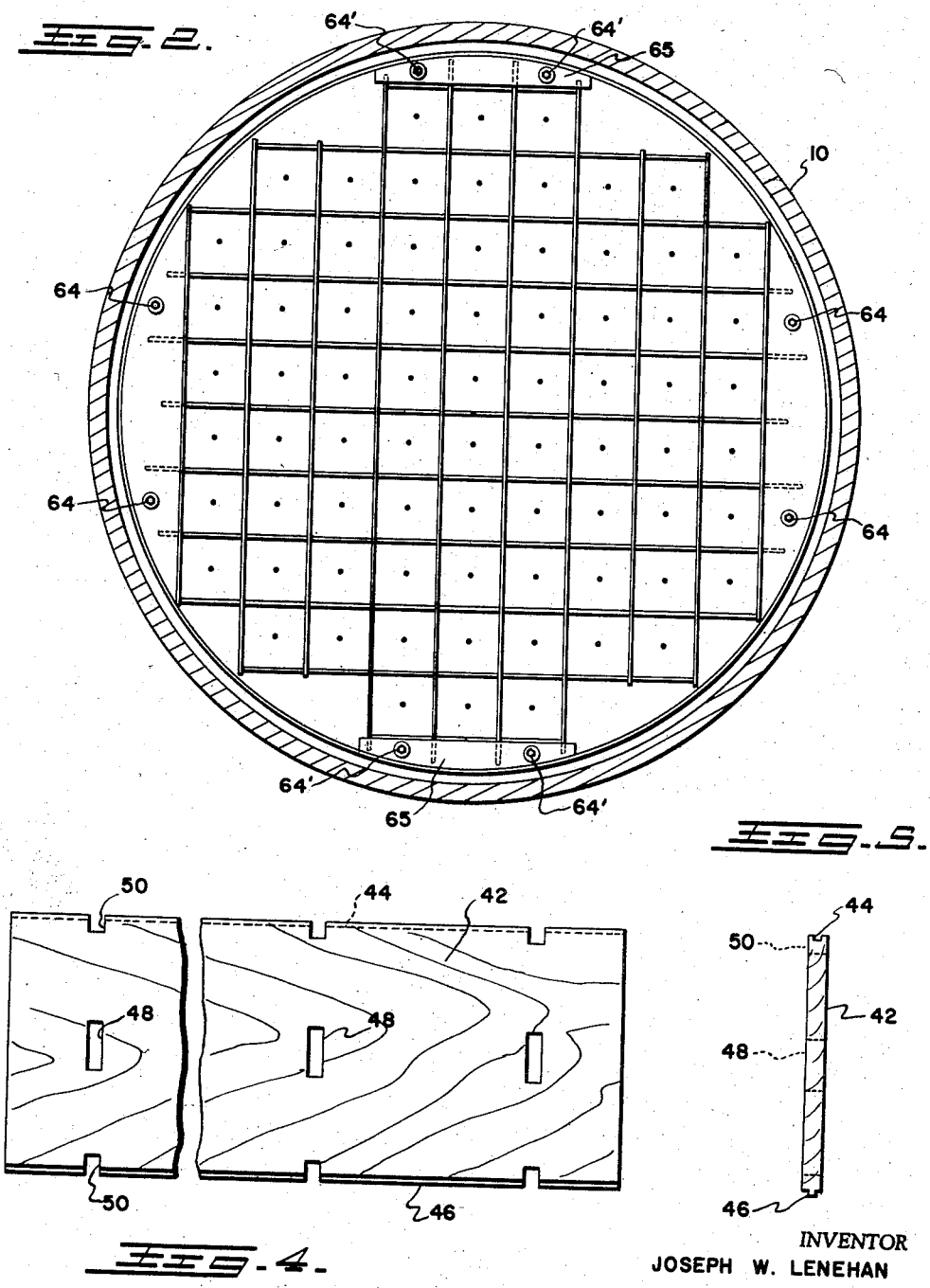
INVENTOR
JOSEPH W. LENEHAN
BY *Harold T. Stowell*
ATTORNEY

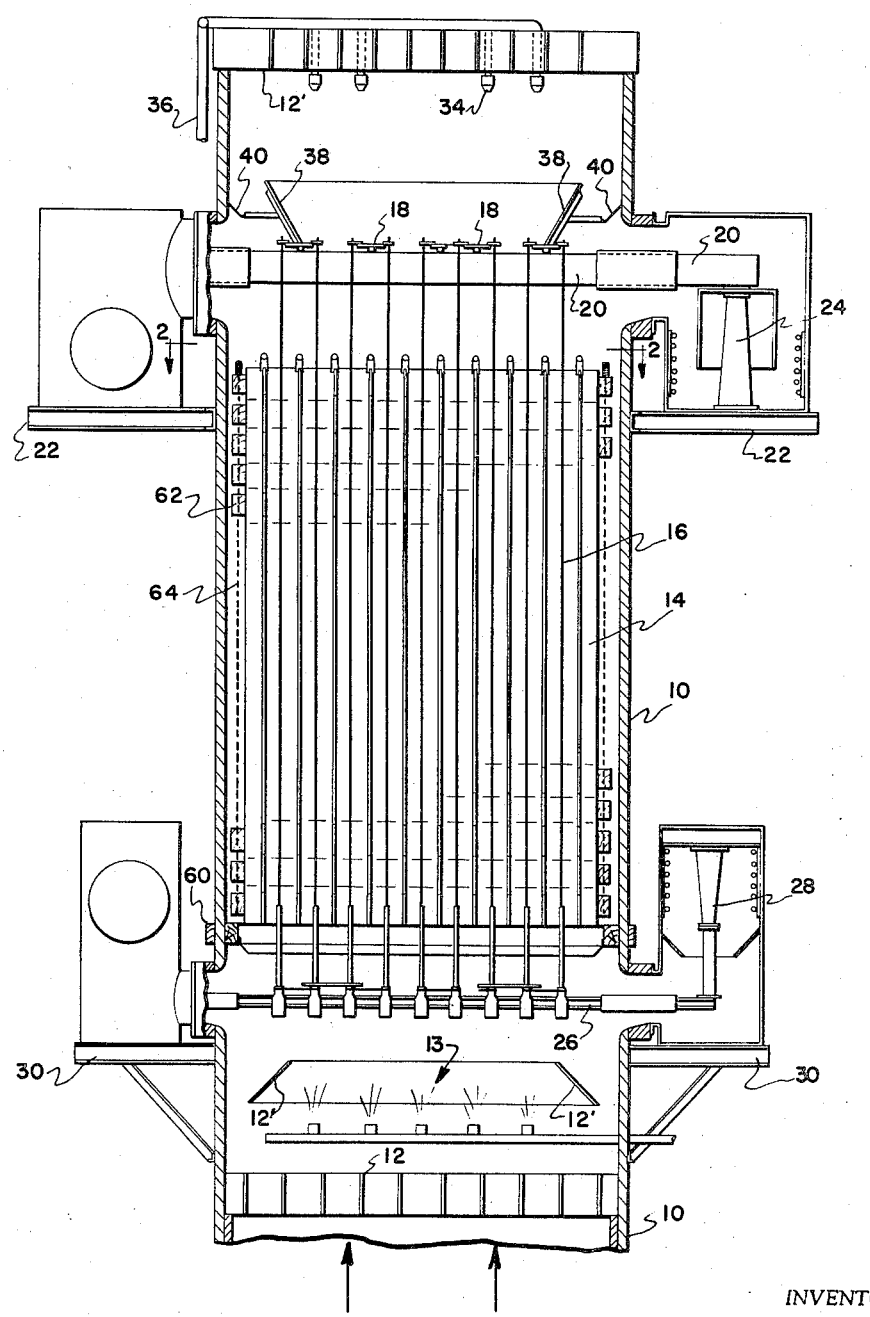

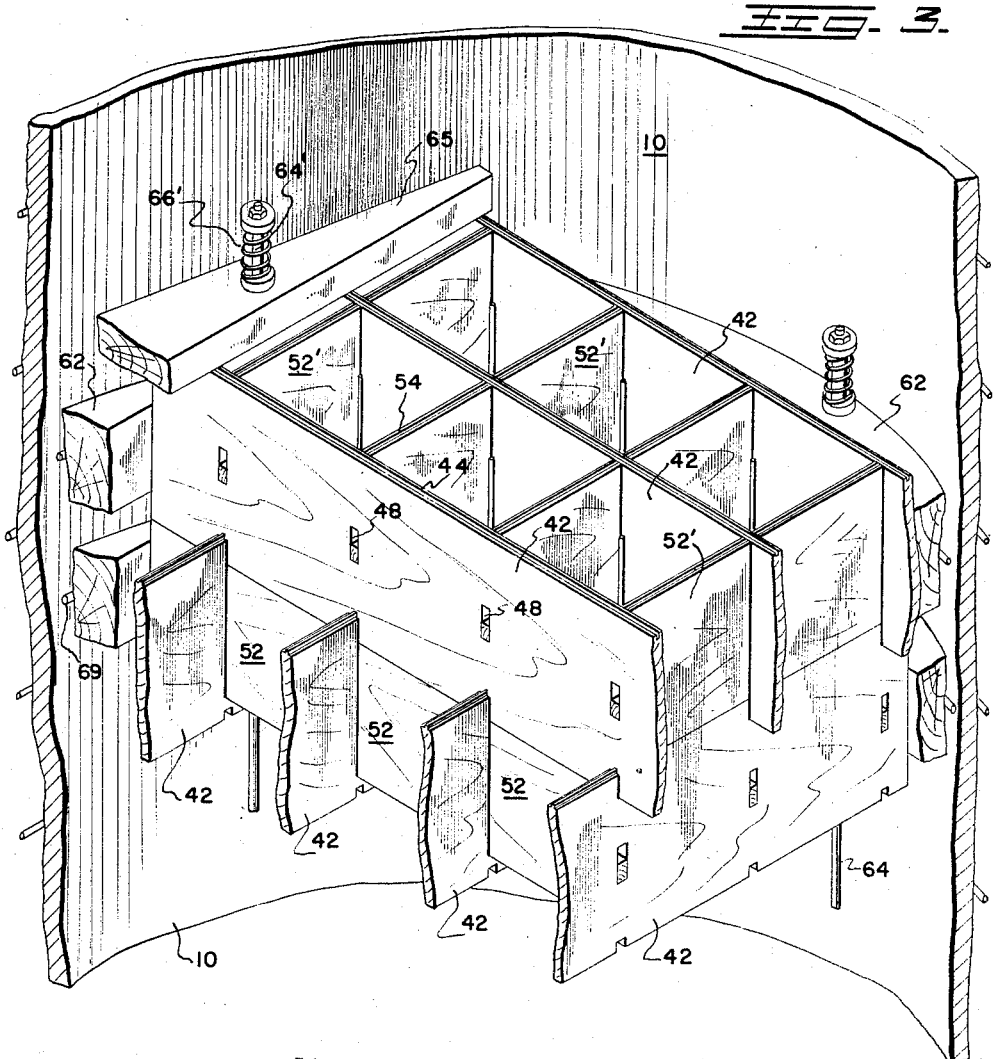
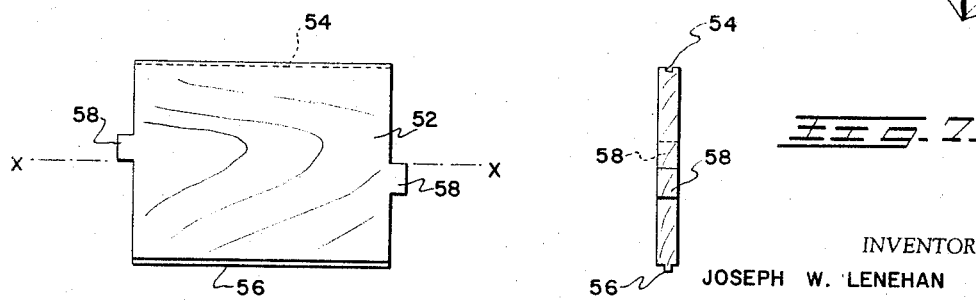
INVENTOR
JOSEPH W. LENEHAN
BY Harold T. Stowell
ATTORNEY

Sept. 23, 1958
J. W. LENEHAN
2,853,150
COLLECTING ELECTRODE STRUCTURE
Filed June 3, 1955
5 Sheets-Sheet 4
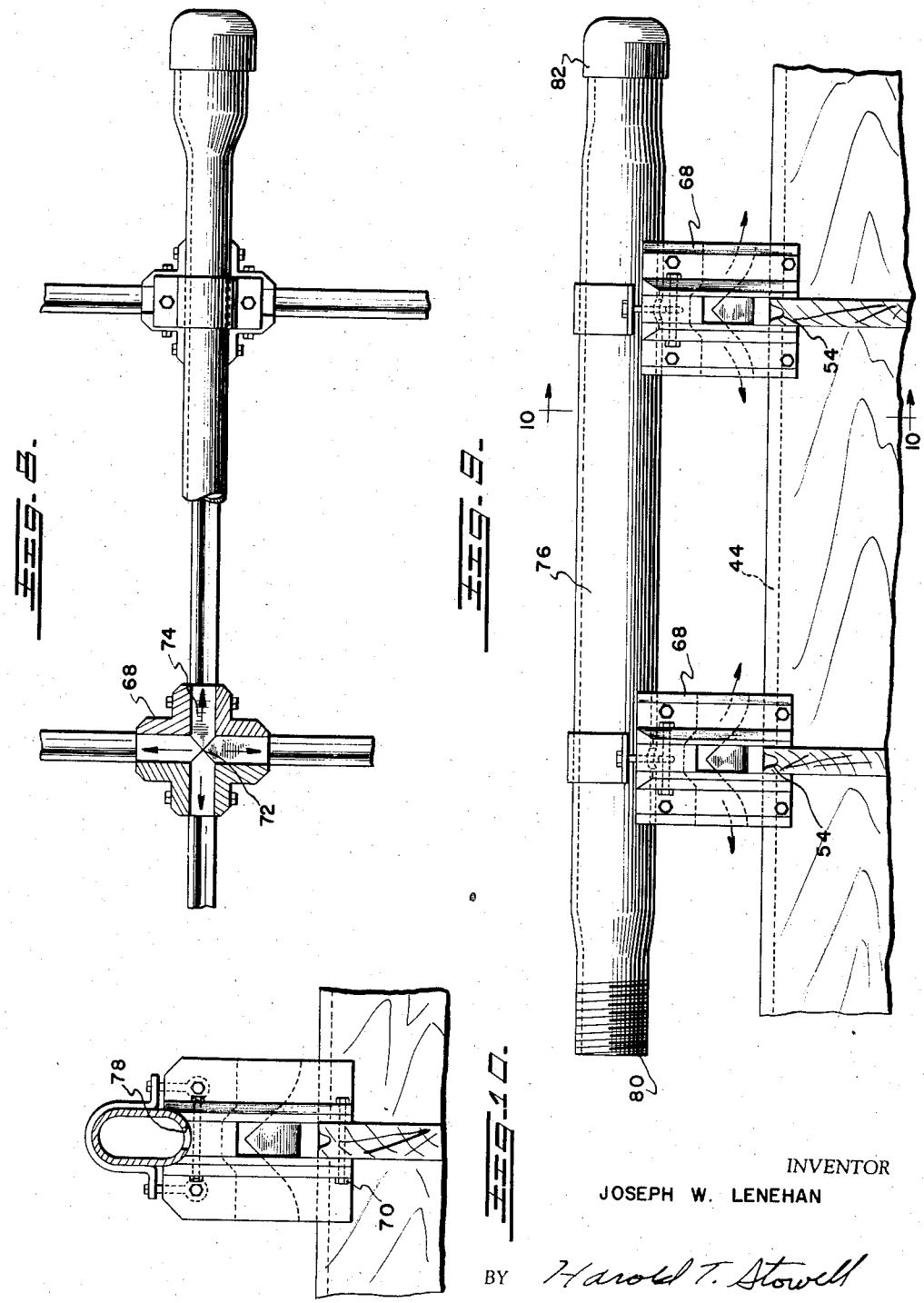
INVENTOR
JOSEPH W. LENEHAN
BY *Harold T. Stowell*
ATTORNEY Sept. 23, 1958   J. W. LENEHAN   2,853,150
COLLECTING ELECTRODE STRUCTURE
Filed June 3, 1955   5 Sheets-Sheet 5
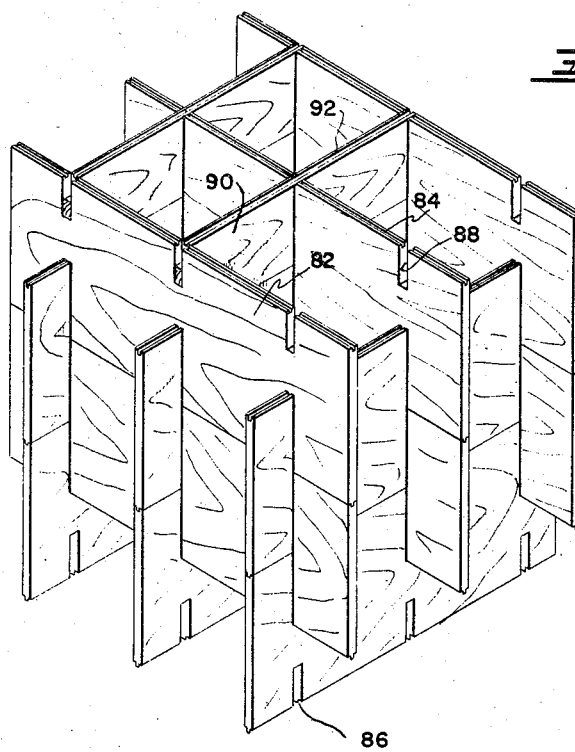
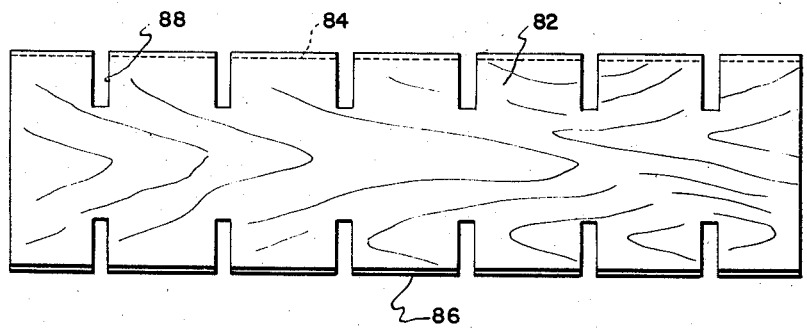
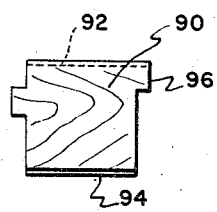
INVENTOR
JOSEPH W. LENEHAN
BY *Harold T. Stowell*
ATTORNEY United States Patent Office 2,853,150
Patented Sept. 23, 1958

2,853,150
COLLECTING ELECTRODE STRUCTURE

Joseph W. Lenehan, New Brunswick, N. J., assignor to Research Corporation, New York, N. Y., a corporation of New York Application June 3, 1955, Serial No. 512,952

4 Claims. (Cl. 183—7)

The present invention relates to electrical precipitation apparatus and more particularly and specifically to new and improved wooden, liquid washed collecting electrode plates for precipitation of particles having corrosive characteristics.

Numerous problems have been encountered in providing both efficient and durable precipitation apparatus for treating gases laden with suspended particles having corrosive properties. Where, in the past, advances have been made in providing more durable and lasting apparatus capable of withstanding and resisting the destructive properties of corrosive elements in flue gases, the effectiveness and efficiency of the precipitation apparatus has been substantially decreased. At the same time, those constructions which have proved to increase the effectiveness and efficiency of the collecting plates in gas precipitation apparatus have proved to be less durable and more costly by reason of repair and replacement requirements when subjected to gases containing corrosive particles.

It is, therefore, a general object of the present invention to provide new and improved gas precipitation apparatus for treating gases containing suspended matter having corrosive properties which improved apparatus serves to eliminate many of the problems and disadvantages which have been inherent in prior constructions.

It is a further general object to provide new and improved collecting electrode structures for electrostatic precipitators that are durable, relatively inexpensive to manufacture and simple to erect.

Another object of this invention resides in the provision of precipitation apparatus for treating gases containing corrosive elements which provides a unique collecting electrode plate construction which affords a maximum of precipitation efficiency and which is of corrosive-resistant construction affording a durable and long lasting construction having a minimum requirement for repair and replacement.

A further object of this invention is to provide a collecting plate construction for electrostatic precipitation apparatus having a unique liquid flushing arrangement which serves to increase the efficiency of the precipitation and at the same time reduce corrosive action on the plate surfaces.

A still further object of this invention lies in the provision of unique and improved collecting plate construction which enables the simple and rapid assembly of a wooden collecting electrode assembly within a precipitator shell.

Still another object of this invention lies in the provision of a wooden collecting plate assembly for electrostatic precipitators which is so assembled as to provide for expansion, contraction and wear with the necessary adjustments being quickly and readily accomplished.

Further objects and advantages of the present invention will become apparent to those skilled in the art from the following general statement and description when read in the light of the accompanying drawings.

The present invention may be described in general terms as including an improved collecting electrode assembly comprising two sets of members, the members of one set extending at right angles to the members of the other set, the members of each set being arranged in a plurality of vertical parallel tiers, the members of one set being vertically displaced with respect to the members of the other set, members of at least one set being slotted to interlock with the members of the other set, and filler members positioned at the top of the tiers of one set and the bottom of the tiers of the other set to extend the vertical surfaces presented by the tiers into coextensive relation.

Referring to the accompanying drawings in which like numerals designate similar parts throughout the several views, Fig. 1 is a vertical section through the improved precipitation apparatus constituting the present invention.

Fig. 2 is a horizontal section taken on line 2—2 of Fig. 1.

Fig. 3 is a fragmentary perspective view illustrating a portion of the upper end of the collecting plate assembly.

Fig. 4 is a side elevation of one of the component members of a collecting plate.

Fig. 5 is an end elevation of Fig. 4.

Fig. 6 is a side elevation of another component of a collecting plate.

Fig. 7 is an end elevation of Fig. 6.

Fig. 8 is a fragmentary plan view illustrating the wash liquid means associated with the collecting plates.

Fig. 9 is a side elevation of the apparatus shown in Fig. 8.

Fig. 10 is a vertical section taken on line 10—10 of Fig. 9.

Fig. 11 is a perspective illustration of a modified form of collecting plate assembly.

Fig. 12 is a side elevation of a component of the modified collecting plate assembly of Fig. 11, and Fig. 13 is another component of the modified collecting plate assembly of Fig. 11.

Referring to the drawings and in particular Figs. 1, 2 and 3 thereof, 10 generally designates a vertically extending stack or the like, into the lower end of which is fed a carrier gas stream containing suspended particulate material. In the form of the invention shown in the drawings, the stack 10 is cylindrical in cross section and is constructed of wood to prevent corrosion by the materials suspended in the gas stream to be treated.

At the lower end of the stack downstream from the gas stream entrance is provided a gas distributing baffle 12 and gas deflector vanes 12'. Above the baffle 12 is provided a series of spray means 13 which provide entrained droplets of water in the gas stream to be cleaned. The water droplets are electrically precipitated in the precipitation zone and augment the liquid runoff in the cleaning of the collecting electrodes as will be understood from the following description. The water droplets are prevented from reaching the insulators 28 primarily by the deflector vanes 12'.

Above the spray means 13 is the electrostatic precipitation apparatus of the present invention which generally includes extended surface collecting plate electrodes 14 and cooperating fine wire discharge electrodes 16.

The discharge electrodes 16 are suspended from channel members 18 carried by bus bar 20 insulatedly supported at its ends by insulators 24 mounted in insulator compartments 22 secured to the outer surface of the stack 10.

The lower ends of the discharge electrodes 16 are attached to a retaining frame 26 to secure the electrodes from lateral displacement and from swinging from side to side in the gas stream. The supporting frame 26 is secured to the stack by means of insulators 28 positioned within insulator compartments 30 which are similar in construction to the insulator compartments 22.

Positioned above the electrostatic section is one or more aqueous spray devices 34 connected to a source of spray liquid through conduit 36. The spray devices 34 aid in the humidification of the gas stream and provide a film of liquid for washing precipitated material from the discharge electrodes 16.

Positioned above the spray devices 34 and at the uppermost portion of the stack 10 are baffles or grills 35 which may be provided to prevent stack cross winds from affecting the distribution of the gases within the precipitator section. The high tension frame is provided with an outwardly inclined baffle 38 concentrically about its upper surface serving to deflect the spray from the heads 34 inwardly and to protect the ends of the frame where they are supported by the insulators 24. An additionally inclined gutter 40 is provided continuously about the inner wall of the shell to catch and deliver spray liquid away from the extended ends of the bus bar 20.

The collecting electrodes 14 supported within the shell 10 include as best seen in Fig. 3, two sets of members, with the members of one set extending at right angles to the members of the other set and the members of each set being arranged in a plurality of vertical parallel tiers. Each set of members is constructed in the preferred form of the invention of wooden plates.

The plates in each set are formed from a plurality of two forms of component parts, one form, illustrated in Fig. 4, consists of an upright rectangular component 42 which is provided longitudinally of its upper edge with a central groove 44, and longitudinally of its lower edge with a tongue 46. Each of the components is provided at equally spaced distances longitudinally of its length, and in equally spaced relationship vertically of its height, with rectangular openings or slots 48 extending through the thickness of the component. Still further, the upper and lower longitudinal edges of the component are provided with inwardly formed rectangular notches 50 at equally spaced intervals along the length of the component with the notches in both the upper and lower longitudinal edges thereof being vertically aligned.

The other component member utilized in the collecting electrode assembly, as illustrated in Fig. 6, takes the form of an upright rectangular board 52 of substantially lesser length than the component 50 and provided similarly with a groove 54 longitudinally of one edge and a tongue 56 longitudinally of the second edge. Further, the two ends of the component 52 are provided with rectangular projections 58; the projections at each end of a single component being equally offset vertically on the opposite sides of the longitudinal center line x—x of the component.

In the utilization of the components 42 and 52 to construct the collecting plate assembly as illustrated in Fig. 3, components 42 and 52 are built up vertically in layers one above the other to provide an assembly of parallel, perpendicular tiers of components forming continuous collecting plates defining substantially square gas passages therebetween. In assembling the collecting apparatus a plurality of components 42 are arranged in parallel relationship in one direction of the shell with the spacing intermediate adjacent components being equal to the length of the components 52. By this arrangement components 52 are positioned perpendicularly intermediate adjacent components 42 at intervals along the length thereof corresponding to the intervals between the rectangular slots 48 in the components 42 so that the projections 58 on the ends of the components 52 will extend into the slots 48 in the components 42. By placing the components 52 which are aligned transversely of the assembled parallel components 42 with the grooved edges 54 thereof upwardly the vertically staggered projections 58 at each of their ends will cooperate one with the other on adjacent components 52 along the row to rest one upon the other in the slots 48 in the intermediate components 42.

When a plurality of components 42 and 52 are arranged in parallel, and in perpendicular relationship as described, one layer of the collecting plate assembly has been completed. In assembling a second layer upon the first, a plurality of components 42 are arranged in vertical alignment above the rows of components 52 in the lower layer with the lower edges of the components 42 being received downwardly in the notches 50 in the upper edges of the components 42 in the lower layer and with the tongues 46 along the lower edges of the components 42 being received in the grooves 54 in the upper edges of the components 52 therebeneath.

At the same time, components 52 are then arranged in vertical alignment in the upper layer above the components 42 in the lower layer with the tongues 56 in the lower edges of the components 52 being received in the grooves 44 in the upper edges of the components 42 in the lower layer and with the projections 58 at each end of each of the components 52 being received in the slots 48 in the components 42 in the upper layer meshing in end to end relationship as heretofore described.

In erecting the collecting plate assembly vertically within the stack 10 the assembly may be erected to any height by alternately repeating the layer constructions as have been heretofore described with the lowermost layer in the assembly being supported on a base ring 60 carried about the lower end of the stack 10.

Since members or components 42 have a greater height than components 52, it is seen that the members of one set are vertically displaced with respect to the members of the other set. Therefore, filler members 52' similar to components 52 are positioned in the upper and lowermost layers to extend the vertical surfaces presented by the tiers into coextensive relation.

When the collecting plate assembly has been erected to the desired height, a plurality of hoops 62, each hoop being formed by four separate parts abutting serially at the corners of the assembly, are arranged in vertically spaced relationship to tensionally retain the components of the assembly in tightly interlocked condition. The inner faces of the members forming the hoops 62 are flat to abut the outer faces of the sides of the assembly, while the outer faces of the hoop members are of circular configuration to facilitate the use of tension bands 69 or the like continuously about each hoop.

The hoops 62, as more clearly shown in Figs. 1 through 3, are vertically interconnected by four tie rods 64 which extend through bores in the hoops. The lower ends of rods 64 are secured to the lowermost hoop and the upper ends are provided with spring seats 66 to resiliently interlock the assembly of layers. In addition to tie rods 64, the tie rods 64' are provided. Tie rods 64' interconnect the hoops 62 in a manner similar to tie rods 64, except that the upper ends of tie rods 64' extend above the upper surface of the uppermost layer of the electrodes and pass through bores in blocks 65 to which one end of springs 66' bear.

It is important to note at this point that it is contemplated that all of the wooden members 42, 52 and 52' constituting the collecting plate assembly are manufactured so that the grain therein, when assembled as described, extends at right angles to the axis of the shell whereby expansion of the wood parallel to the grain, which is very small, can be absorbed and accommodated by the hoops 62 surrounding the assembly, and the expansion of the wood across the grain, which is substantially greater, can be compensated for by means of the spring seated tie rods 64 and 64' vertically of the assembly.

Associated with the grooves 44 and 54 in the top layer of the plate assembly is a liquid washing system which includes at each intersection of the perpendicular components, the block member 68 which is secured by bolts 70 or the like to the components of the assembly and which has a centrally built-up portion 72 vertically above the intersection of the components with four inclined passages 74 extending at right angles from the raised portion 72 outwardly and downwardly of the block with each passage aligning with the grooved top of one of the four legs of the two components intersecting below the block. Associated with the blocks 68 is a system of liquid feed pipes 76 which extend longitudinally of each component in the same direction of the assembly to be supported across the tops of each of the blocks in each of the parallel rows. Liquid discharge openings 78 are provided in the bottoms of the pipes and aligned directly above the raised points 72 in each of the blocks. Liquid is supplied to one end of each of the pipes as at 80, with the second end of each of the pipes being capped as at 82.

Thus in accordance with the foregoing, water, or similar wash liquid, is supplied to each of the pipes 76 and discharged downwardly upon the raised portion 72 centrally of each block whereupon it will flow downwardly and outwardly of the four inclined passages 74 and discharge into the grooves 44 and 54. From the grooves the wash liquid overflows and continuously washes the interior surfaces thereof of precipitated material.

While in the form of the invention shown in the drawings the grooves 54 are employed as liquid conducting channels in the uppermost layer, it has been found that where desired, the grooves may be left off the uppermost layer and the upper edges slightly rounded without losing the effectiveness of the novel wash system.

Referring to Figs. 11 through 13 there is illustrated a modified construction of the collecting plate assembly wherein the assembly proper consists of a plurality of layers of component members interposed and interlocked one upon the other. In this form of construction, the collecting plate assembly is comprised of a plurality of a single form of component 82, which is illustrated in Fig. 12. Member 82 is of rectangular configuration having a longitudinal groove 84 of one edge and a longitudinal tongue 86 of the second edge. In addition the component is provided along each longitudinal edge at equally spaced intervals with a plurality of rectangular slots 88, with the slots on both edges being aligned.

In assembling the multiple layers constituting the collecting plate assembly a plurality of the components 82 are arranged, each in upright position, in parallel spaced rows in one direction and then a second plurality of the same component are arranged in spaced parallel rows perpendicularly of the first and are interlocked therewith by aligning the slots 88 in the lower edges of the upper layer vertically above the slots in the upper edges in the lower layer. It is to be noted that the depth of the notches 88 in each of the components is about one-fourth of the vertical depth of the components so that by mating the notches 88 in the components of the upper layer with the notches 88 in the components of the lower layer the lowermost edges of the upper components will be located half the vertical distance below the upper edges of the components of the lower layer. By alternating components in successive vertical tiers in the manner described the components extending in alignment in one direction of the assembly will abut vertically, as illustrated in Fig. 11, with the tongues 86 of the upper components being received in the grooves 84 in the lower components. This assembly provides for a collecting plate assembly having continuously solid collecting plate surfaces in two directions of the assembly defining a plurality of parallel gas passages vertically of the assembly.

In order to provide a flush top and bottom in the upper and lower layers, a plurality of vertically arranged filler members 90, as illustrated in Fig. 13, are provided, which are of substantially square configuration having grooves 92 in their upper edges and tongues 94 on their lower edges. In addition each end of each filler member 90 is provided with a rectangular projection 96 with the projections on remote ends of each component being vertically offset so that a component 90 may be inserted downwardly between adjacent components 82 in the upper tier of the assembly to bring the tongue 94 on the lower edge into coincidence with the groove 84 in the component 82 therebelow and to bring the projections 96 on adjacent abutting components 90 into vertically aligned and overlapping relationship in the slot 88 in the component 82 separating the ends of adjacent components 90.

From the foregoing disclosures and descriptions it will be seen that unique and improved collecting electrode plate assemblies have been provided for utilization in electrostatic precipitators which embody the provision of wooden, nonconductive collecting plates formed from a plurality of interlocking components arranged in vertical layers and defining a plurality of parallel gas passages throughout the length of the plate assembly. This construction enables the quick and easy erection of a collecting plate assembly within precipitation apparatus.

It is further evident that the present invention provides for a collecting plate assembly for electrostatic precipitation apparatus which is highly efficient and extremely resistant to the action of gas suspended particles having corrosive characteristics.

Additionally, the present invention provides for unique characteristics of expansion and contraction within the collecting plate assembly which are automatically controlled and compensated for by the inherent structural details of the assembly, and which further provides for a unique liquid washing arrangement for the vertical collecting surfaces in the assembly to increase the electrostatic precipitation efficiency and at the same time reduce corrosive wear within the assembly.

It will further be seen that by the provision of the square pipe arrangement of tubular electrodes substantially all of the cross-sectional area in the precipitation zone is advantageously utilized.

I claim:

1. A collecting electrode assembly comprising a plurality of superposed layers; each of said superposed layers comprises two sets of vertically offset wooden members, with the members of one set extending at right angles to the members of the other set in its respective layer, the members of at least one set being slotted to interlock with the members of the other set, filler members positioned in the uppermost and the lowermost of the superposed layers to extend the vertical surfaces presented by the layers into coextensive parallel relation, retaining hoops tensionally encircling the assembly normal to the longitudinal axis of the layers, and resilient tie means interconnecting longitudinally the remote ends of the assembly.

2. A collecting electrode assembly comprising a plurality of superposed layers, each of said superposed layers comprises two sets of vertically offset members with the members of one set extending at right angles to the members of the other set in its respective layer, the members of at least one set being slotted to interlock with the members of the other set, filler members positioned in the uppermost and the lowermost of the superposed layers to extend the vertical surfaces presented by the layers into coextensive parallel relation, liquid discharge means at the uppermost edges of the top set of members, comprising liquid conducting channels at the top edges of said set of members for distributing and discharging wash liquid downwardly over the vertical surfaces of the assembly wherein the means for supplying wash liquid to said channels comprises a block member secured above each intersecting juncture of the sets of members, a liquid receiving portion centrally of said block, four liquid distributing passages in the block extending at right angles outwardly from the liquid receiving portion above the channels of the electrode members intersecting below the block, and conduct means connecting a source of wash liquid and said blocks.

3. The invention defined in claim 1 wherein the members of each set are slotted to interlock with each other.

4. The invention defined in claim 1 wherein the members of only one set are slotted and the other set of members are provided with rectangular projections at each end.

References Cited in the file of this patent

UNITED STATES PATENTS

| | | |
|---|---|---|
| 604,388 | Hamilton | May 24, 1898 |
| 686,598 | Evans | Nov. 12, 1901 |
| 700,990 | Stocker | May 27, 1902 |
| 2,207,272 | Simons | July 9, 1940 |
| 2,555,216 | Wintermute | May 29, 1951 |

FOREIGN PATENTS

| | | |
|---|---|---|
| 1,123 | Great Britain | Jan. 16, 1911 |
| 374,089 | Great Britain | May 23, 1932 |
| 360,119 | Germany | Sept. 29, 1922 |
| 747,864 | Germany | Oct. 18, 1944 |

UNITED STATES PATENT OFFICE
CERTIFICATE OF CORRECTION

Patent No. 2,853,150    September 23, 1958

Joseph W. Lenehan

It is hereby certified that error appears in the printed specification of the above numbered patent requiring correction and that the said Letters Patent should read as corrected below.

Column 7, line 1, claim 2, for "conduct" read -- conduit --.

Signed and sealed this 30th day of December 1958.

(SEAL)
Attest:

KARL H. AXLINE
Attesting Officer

ROBERT C. WATSON
Commissioner of Patents